(12) United States Patent
Wong et al.

(10) Patent No.: US 8,107,375 B1
(45) Date of Patent: Jan. 31, 2012

(54) BANDWIDTH PROJECTION FOR CUSTOMER BANDWIDTH USAGE

(75) Inventors: Kanglung Wong, Overland Park, KS (US); Amy L. Welsh, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 368 days.

(21) Appl. No.: 12/015,336

(22) Filed: Jan. 16, 2008

(51) Int. Cl.
*H04L 12/26* (2006.01)
(52) U.S. Cl. ........................................ 370/232
(58) Field of Classification Search .......... 370/468, 370/465, 464, 229, 230, 232, 235, 329, 352, 370/412, 437, 442, 443; 725/127
See application file for complete search history.

(56) References Cited

U.S. PATENT DOCUMENTS

| | | | |
|---|---|---|---|
| 6,823,385 B2 | 11/2004 | McKinnon, III et al. | |
| 6,845,106 B2 | 1/2005 | McKinnon, III et al. | |
| 6,917,622 B2 | 7/2005 | McKinnon, III et al. | |
| 6,993,044 B2 | 1/2006 | McKinnon, III et al. | |
| 7,009,992 B2 | 3/2006 | McKinnon, III et al. | |
| 7,184,398 B2 | 2/2007 | McKinnon, III et al. | |
| 2001/0038639 A1 | 11/2001 | McKinnon, III et al. | |
| 2001/0038640 A1 | 11/2001 | McKinnon, III et al. | |
| 2001/0038645 A1 | 11/2001 | McKinnon, III et al. | |
| 2001/0039582 A1 | 11/2001 | McKinnon, III et al. | |
| 2001/0043617 A1 | 11/2001 | McKinnon, III et al. | |
| 2002/0003806 A1 | 1/2002 | McKinnon, III et al. | |
| 2002/0118699 A1 | 8/2002 | McKinnon, III et al. | |
| 2002/0126686 A1 | 9/2002 | McKinnon, III et al. | |
| 2002/0129143 A1 | 9/2002 | McKinnon, III et al. | |
| 2004/0111308 A1* | 6/2004 | Yakov | 705/8 |
| 2006/0114926 A1* | 6/2006 | McKinnon et al. | 370/443 |
| 2007/0189298 A1* | 8/2007 | Wong et al. | 370/395.1 |
| 2008/0037578 A1* | 2/2008 | Carlson et al. | 370/463 |
| 2009/0031384 A1* | 1/2009 | Brooks et al. | 725/127 |

* cited by examiner

*Primary Examiner* — Raj Jain

(57) ABSTRACT

A method of operating a bandwidth projection system is disclosed, wherein the method comprises determining an initial shared bandwidth projection for an access node having an initial bandwidth capacity, generating a plurality of guaranteed bandwidth projections for the access node, determining an aggregate bandwidth projection comprising the plurality of guaranteed bandwidth projections and the initial shared bandwidth projection, and processing the aggregate bandwidth projection to determine if the aggregate bandwidth projection exceeds the initial bandwidth capacity of the access node.

14 Claims, 10 Drawing Sheets

BANDWIDTH PROJECTION FOR CUSTOMER BANDWIDTH USAGE

TECHNICAL BACKGROUND

Communication service providers provide communication services to customers over communication links, such as wireless, T-1, and Internet links. Communication links should be sized with the appropriate capacity to handle customer traffic. Bandwidth is a measure of communications capacity over a communication link.

In many cases, service providers enter into service contracts with customers that require the service providers to provide the customers with guaranteed minimum amounts of bandwidth during future time periods. Bandwidth projections are used to determine the minimum amounts of bandwidth. Communication service providers utilize bandwidth models to project the future bandwidth needs of their customers. To make future projections, communication service providers use a model application to generate a bandwidth model based on a historical dataset. The bandwidth model is used to create the future projection. For example, a service provider may use a linear projection to size a T-1 communication link based on erlang data.

When the minimum amount of bandwidth specified by a bandwidth projection is less than an actual bandwidth need, the service provider may not provide enough bandwidth to the customer. When the minimum amount of bandwidth specified by a bandwidth projection is greater than the actual bandwidth need, the service provider may waste bandwidth. It is therefore important for bandwidth projections to track actual bandwidth needs as closely as possible.

FIG. 1 illustrates a graph of a historical dataset. Flaws in the historical datasets can produce inaccurate projections. The vertical axis of the graph in FIG. 1 indicates bandwidth usage. The horizontal axis of the graph indicates a twelve month period. FIG. 1 illustrates the historical data set as points on the graph. The historical dataset includes discrete measurements of bandwidth used by a customer over the twelve month period.

As illustrated in FIG. 1, the historical data set includes missing data and outliers. The missing data and outliers are circled. Missing data is identified at month 3. Outliers are identified at months 6 and 10. A bandwidth projection based on the historical data set of FIG. 1 could be flawed or distorted due to the missing data and the outliers. For instance, the missing data could lower the bandwidth projection. The outliers could either increase or decrease the projection erroneously.

In another problem, linear models frequently do not closely resemble historical data sets and do not produce accurate bandwidth projections. In many cases, the relationship between bandwidth usage and time may not be linear. For example, the graph of bandwidth usage over time by a customer often times will not follow a straight line and may include many peaks and troughs that correspond to high and low bandwidth usage. However, the graph of a linear model is a straight line. The graph of a linear bandwidth projection will also be a straight line. The linear bandwidth projection will produce periods of time where the projection is too high and other periods of time where the projection is too low when compared to actual bandwidth usage.

FIG. 2 illustrates a graph of a linear model in an example of the prior art. As is well known in the art, a linear regression process could be executed on the historical dataset of FIG. 1 to generate the linear model. The graph in FIG. 2 also illustrates the historical dataset shown in FIG. 1. By comparing the graph of the linear model to the historical dataset, FIG. 2 shows how linear models do not accurately model actual bandwidth usage.

The vertical axis of the graph in FIG. 2 indicates bandwidth usage. The horizontal axis of the graph indicates a twelve month period. As illustrated in FIG. 2, the graph of the linear model is a straight line, whereas the graph of the historical dataset includes waves and troughs. During periods of high usage (months 2, 7, and 12, for example), the graph of the linear model is lower than the graph of the historical dataset. During periods of low usage (months 5 and 9, for example), the graph of the linear model is higher than the graph of the historical dataset.

If the linear model graphed in FIG. 2 were used to produce a bandwidth projection, the bandwidth projection would not accurately project future bandwidth usage. Rather, the bandwidth projection would be higher than the actual future bandwidth usage during some periods of time. The bandwidth projection would be lower than the actual future bandwidth usage during other periods of time.

Further problematically, linear bandwidth models are generated using only a single model application. Using only a single model application limits the resulting bandwidth models from which a best fit bandwidth model is selected.

Overview

In an embodiment of the invention, a method of operating a bandwidth projection system comprises determining an initial shared bandwidth projection for an access node having an initial bandwidth capacity, generating a plurality of guaranteed bandwidth projections for the access node, determining an aggregate bandwidth projection comprising the plurality of guaranteed bandwidth projections and the initial shared bandwidth projection, and processing the aggregate bandwidth projection to determine if the aggregate bandwidth projection exceeds the initial bandwidth capacity of the access node.

In an embodiment, a software product for operating a bandwidth projection system comprises software and a storage medium readable by the bandwidth projection system having the software stored thereon. The software is operational when executed by the bandwidth projection system to direct the bandwidth projection system to determine an initial shared bandwidth projection for an access node having an initial bandwidth capacity, generate a plurality of guaranteed bandwidth projections for the access node, determine an aggregate bandwidth projection comprising the plurality of guaranteed bandwidth projections and the initial shared bandwidth projection, and process the aggregate bandwidth projection to determine if the aggregate bandwidth projection exceeds the initial bandwidth capacity of the access node.

DETAILED DESCRIPTION

Figure 3:
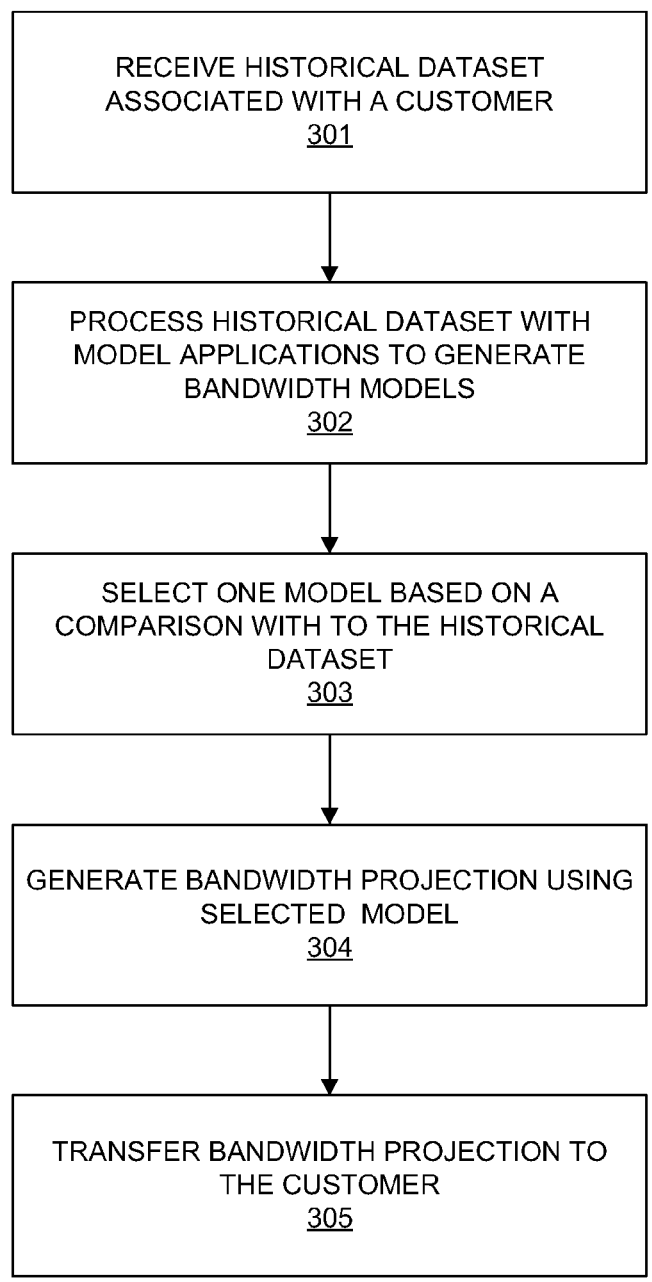
FIG. 3 illustrates a process in an embodiment of the invention.

FIGS. 3-10 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalent FIG. 3 illustrates a process 300 in an embodiment of the invention. The process 300 could be employed by a bandwidth projection system to generate bandwidth projections.

Referring to FIG. 3, the bandwidth projection system receives a historical dataset (Step 301). The historical dataset could be associated with a customer. The historical dataset indicates bandwidth usage by the customer during a historical time period.

Upon receiving the historical dataset, the bandwidth projection system processes the historical dataset with multiple model applications to generate multiple bandwidth models based on the historical dataset (Step 302). It should be understood that the multiple bandwidth models could be non-linear models.

Figure 1:
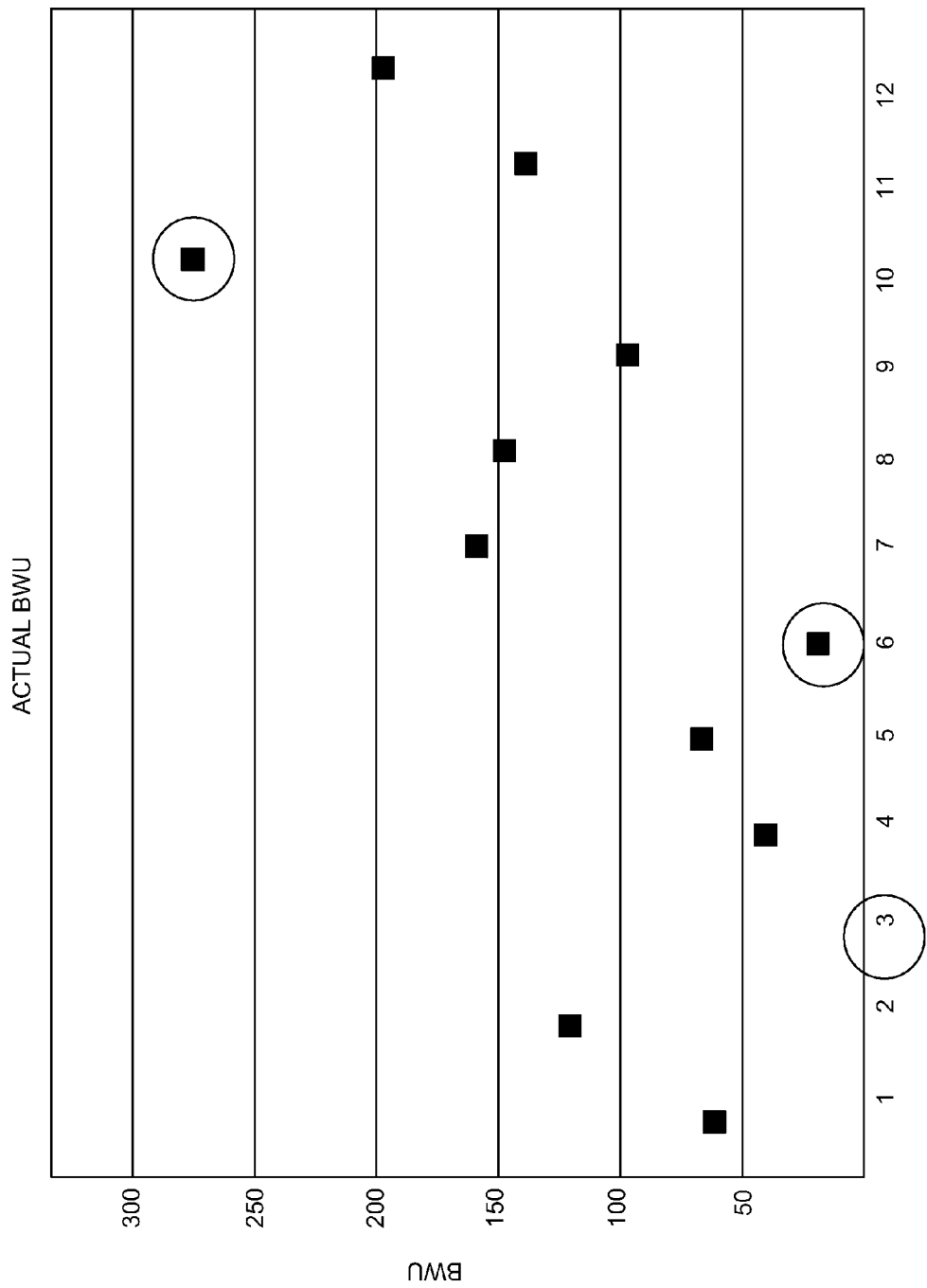
FIG. 1 illustrates a graph of a historical dataset.
Figure 2:
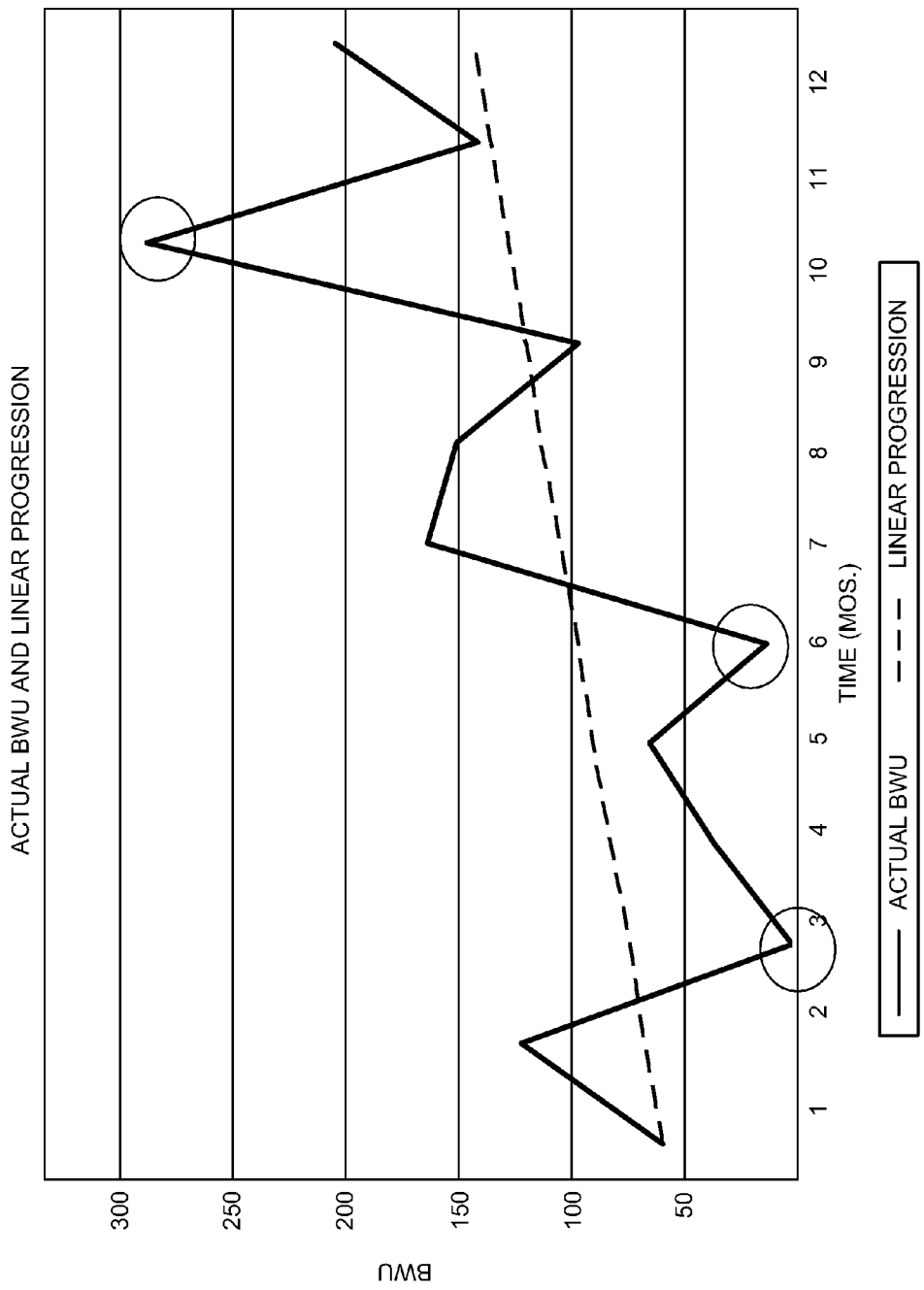
FIG. 2 illustrates a graph in an example of the prior art.

Processing the historical dataset could include cleaning the dataset, such as by rectifying missing data or outliers. For example, the missing data at 3 months in FIG. 1 could be replaced with new data. In another example, the outliers at 6 months and 12 months could be replaced with new data. For instance, the new data could be derived from the average of all data in the dataset or the average of nearby data.

Processing the historical dataset to generate the bandwidth models could also include processing various factors that influence the bandwidth models, such as growth, chronological, and seasonal factors. The model applications can weight the historical data set based on the various factors.

In an example of a chronological factor, more recent data could be given a greater weight than older data. If the more recent data is weighted more than the older data, the more recent data would have a greater impact on the generation of a bandwidth model by a model application. For instance, recent data in a dataset may indicate high bandwidth usage, whereas older data may indicate low bandwidth usage. If the recent data is weighted greater than the older data, a bandwidth model based on the dataset would emphasize the high bandwidth usage, rather than the low bandwidth usage. The high bandwidth usage would be incorporated into any future bandwidth projections generated by the bandwidth model.

In an example of a seasonal factor, certain periods of time could be given a greater weight than other time periods. For example, a dataset may indicate a bandwidth spike during a single month. By weighting the data for that particular month, a resulting bandwidth model generated using the dataset would accurately reflect the spike. Assuming the spike is a recurring phenomenon, a future bandwidth projection generated by the bandwidth model will incorporate the spike.

In an example of a growth factor, bandwidth growth of a certain rate could be incorporated by the model applications into the bandwidth models. The bandwidth models could be constructed to produce a bandwidth projection based on the growth rate. For instance, for a past time period a bandwidth model might accurately represent the historical dataset. However, for a future time period a growth rate may be assumed. Therefore, the bandwidth model should incorporate a growth rate into the patterns associated with the historical dataset.

It should be understood that each model application could be different. For example, one model application could be a Holt-Winters model application, while another model application could be an exponential model application. Other types of model applications are possible. Model applications are available from model application vendors. SAS is an example of a vendor. Each different model application could therefore process the historical datasets differently and generate different bandwidth models.

It should be further understood that each model application could generate multiple bandwidth models by processing the historical dataset differently for each bandwidth model. For example, a first model application could weight a historical dataset to generate a first bandwidth model. The second model application could then weight the historical dataset differently in order to generate a second bandwidth model. The first and second bandwidth models would differ as result of the different weightings.

After generating the various bandwidth models, the bandwidth projection system selects one of the bandwidth models from the multiple bandwidth models based on a comparison to the historical dataset (Step 303). The bandwidth projection system could perform the comparison between the historical dataset and each of the bandwidth models. In one example, the selected bandwidth model could be the bandwidth model that has the best fit with the historical dataset. A root-mean squared error function is one technique to determine a best fit. Other comparisons are possible.

Once selected, the bandwidth projection system generates the bandwidth projection using the selected bandwidth model (Step 304). The bandwidth projection could indicate a projected bandwidth usage by the customer during a future time period. The bandwidth projection system could then transfer the bandwidth projection to the customer (Step 305). The bandwidth projection could be transferred to the customer over a communication network to a customer device.

Figure 4:
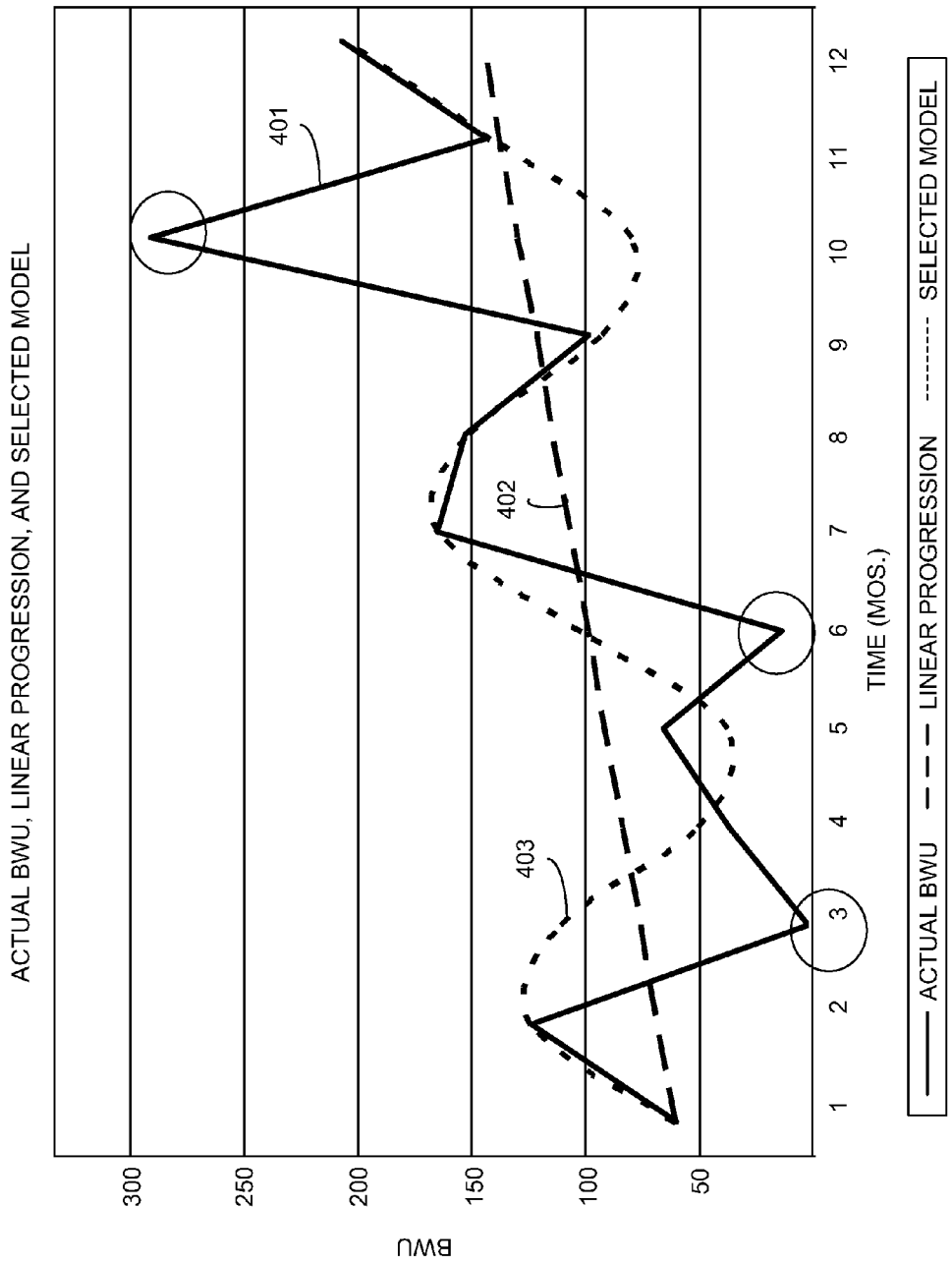
FIG. 4 illustrates a graph in an embodiment of the invention.

FIG. 4 illustrates a graph of a historical dataset 401, a linear bandwidth model 402 in an example of the prior art, and a bandwidth model 403 in an embodiment of the invention.

As discussed in the background, linear models are not accurate bandwidth models because most bandwidth usage patterns include peaks and troughs, whereas linear models, when graphed, follow a straight line. FIG. 4 illustrates how, when compared to a historical bandwidth dataset 401, a graph of a linear bandwidth model 402 does not closely resemble the historical bandwidth dataset 401. FIG. 4 further illustrates how process 300 illustrated in FIG. 3 produces an improved bandwidth model 403 over the prior art.

Referring to FIG. 4, the vertical axis of the graph indicates bandwidth usage. The horizontal axis of the graph indicates a twelve month time period. The historical dataset is the historical dataset illustrated in FIG. 1. The linear model 402 is based on the historical dataset. The bandwidth model 403 is also based on the historical dataset 401. It should be understood that a bandwidth projection system executing the process 300 of FIG. 3 could generate the bandwidth model 403 exemplified in FIG. 4.

As illustrated in FIG. 4, the historical dataset 401 contains several peaks and troughs. For example, peaks occur on the graph of the historical dataset 401 at 2 months, 5 months, 7 months, 8 months, and 10 months. Troughs occur on the graph at 3 months, 6 months, 9 months, and 11 months.

As further illustrated in FIG. 4 the graph of the linear bandwidth model 402 is a straight line and does not closely resemble or track the actual bandwidth displayed by the historical dataset 401. For example, the peaks and troughs of the historical dataset 401 are not approximated by the linear bandwidth model. During some periods, such as during months 1-2 and 7-8, the bandwidth indicated by the linear model 402 is much less than the actual bandwidth indicated in the historical dataset 401. During other periods, such as during months 3-6 and month 9, the bandwidth indicated by the linear bandwidth model 402 is much greater than the actual bandwidth indicated in the historical dataset 401. In addition, the non-linear model 403 at month 10 projects a bandwidth usage lower than the linear model 402 because the non-linear model 403 corrected for the outlier at month 10. In contrast, the linear model 402 did not correct the outlier at month 10.

When developed into a linear bandwidth projection, the linear model used to create graph 402 will produce data that does not track the likely future bandwidth need of the customer. Rather, a graph of the linear bandwidth projection would follow a straight line and would not resemble the likely peaks and troughs of actual bandwidth need. During times of greater bandwidth need, the bandwidth delivered based on the erroneous projection would likely fall short of the need. During times of less bandwidth need, the bandwidth delivered based on the erroneous projection would likely exceed the need.

In contrast to the prior art, the bandwidth model 403 in an embodiment of the invention closely tracks the historical dataset 401. For example, the bandwidth model 403 contains peaks and troughs that resemble the peaks and troughs of the historical dataset 401. It should be understood that the bandwidth model 403 could be a non-linear model, such as a sinusoidal model.

In particular, during some periods, such as during months 1-2 and 7-8, the bandwidth model 403 closely matches the actual bandwidth represented by the historical dataset 401. For instance, the peak that occurs at month two in the historical dataset 401 is closely matched by a peak in the bandwidth model 403. In contrast, the linear bandwidth model 402 contains no such peak.

During other periods, such as during months 3-6 and month 9, the bandwidth model 403 closely resembles the actual bandwidth of the historical dataset 401. For instance, the trough that occurs at month 9 in the historical dataset 401 is closely matched by a trough in the bandwidth model 403.

A bandwidth projection generated based on the bandwidth model illustrated by graph 403 could more closely meet the actual future bandwidth needs of a customer than a projection generated by a linear bandwidth model in the prior art.

Figure 5:
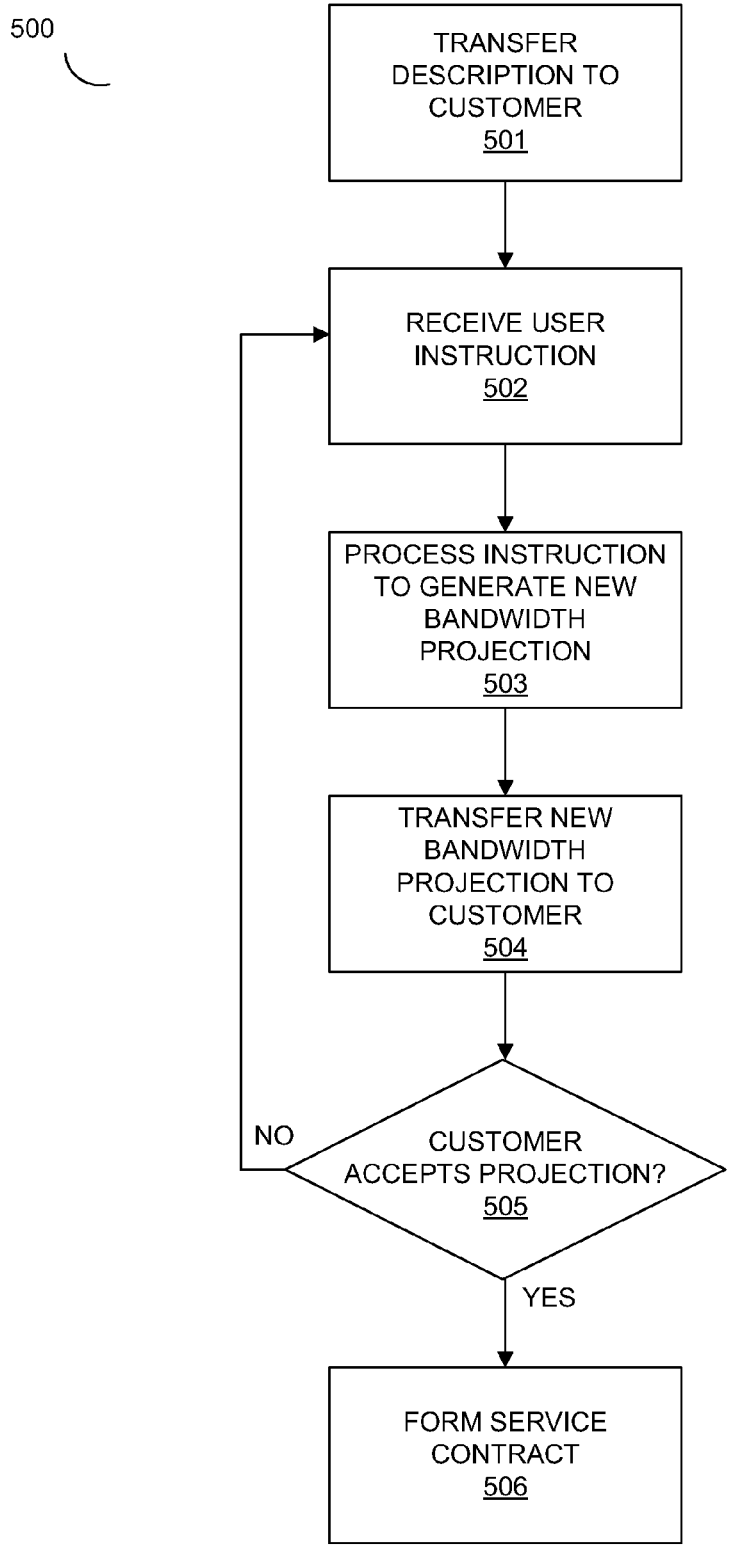
FIG. 5 illustrates a process in an embodiment of the invention.

FIG. 5 illustrates a process 500 in an embodiment of the invention. The process 500 could be employed by a bandwidth projection system to generate a service contract.

Referring to FIG. 5, the bandwidth projection system transfers a model description associated with a bandwidth projection to a customer (Step 501). It should be understood that the bandwidth projection could be generated by the process 300 illustrated in FIG. 3.

The bandwidth projection could have an associated bandwidth model that generated the bandwidth projection. In addition, the bandwidth projection could have an associated model application that generated the associated bandwidth model. The model description could describe the model application used to generate the bandwidth model, the bandwidth model that generated the bandwidth projection, or both.

The bandwidth projection and model description could be transferred automatically to a communication portal, such as a web site, an email server, or the like. The customer could receive the bandwidth projection and responsively generate and return a user instruction. For instance, the user instruction could be related to the bandwidth model, the model application, or both.

The user instruction could indicate factors used by either the model application to generate the bandwidth model or used by the bandwidth model to generate the bandwidth projection, or both. Examples of factors include, but are not limited to, a growth factor, a chronological factor, or a seasonal factor. Other factors are possible.

The bandwidth system receives the user instructions (Step 502). The bandwidth system then processes the user instructions to generate a new bandwidth projection using the user instructions (Step 503). For example, the initial bandwidth projection could have been generated using an initial growth factor. The user instruction could include a new growth factor that is different than the initial growth factor. A new bandwidth projection could be generated using the new growth factor.

In another example, the initial bandwidth projection could have been generated using an initial chronological factor. The user instruction could include a new chronological factor that is different than the initial chronological factor. A new bandwidth projection could be generated using the new chronological factor.

In another example, the initial bandwidth projection could have been generated using an initial seasonal factor. The user instruction could include a new seasonal factor that is different than the initial seasonal factor. A new bandwidth projection could be generated using the new seasonal factor.

After generating the new bandwidth instruction, the bandwidth projection system transfers the new bandwidth projection to the customer (Step 504). The customer could either respond with an acceptance of the new bandwidth projection or rejection the new bandwidth projection (Step 505).

In one example, the bandwidth projection could be presented to the customer via an interface in the form of a proposal for a service contract. The interface could give the customer the option to accept or reject the proposed service contract. In a service contract, the service provider could guarantee specific allocations of bandwidth to a customer during the term of the service contract. A service level agreement (SLA) is an example of a service contract.

If the customer accepts the new bandwidth projection, the acceptance could form a service contract between the service provider and the customer for the bandwidth amount indicated by the new bandwidth projection for a future period of time (Step 506). During the future time period, the service provider could be required by the service contract to provide to the customer the amount of bandwidth indicated by the new bandwidth projection.

If the customer does not accept the new bandwidth projection, the customer could return a new user instruction. In such a case, the process returns to Step 502.

Possible implementations of the transfer, presentation, and acceptance functionality include dedicated systems at the customer site, or a site that the customer shares with another entity. Alternatively, the bandwidth projection system could transfer the bandwidth projection to a web platform, accessible from a customer device. The bandwidth projection and acceptance functionality could be implemented on the web platform.

In an advantage, a bandwidth projection system as described herein could execute multiple model applications to generate bandwidth models. A greater variety of bandwidth models results from utilizing multiple model applications to generate bandwidth models, as opposed to using a single model application as in the prior art. The ability of a service provider to select a bandwidth model that closely resembles the historical bandwidth usage of a customer is improved by having a variety of bandwidth models from which to select a best fit or preferred bandwidth model.

In another advantage, a bandwidth projection system as described herein could generate non-linear bandwidth models. Historical dataset based on customer bandwidth usage can be modeled more closely by non-linear bandwidth models than by linear bandwidth models. In addition, the bandwidth projections generated by the non-linear bandwidth models are more accurate than the bandwidth projections generated by linear bandwidth models.

Many businesses have bandwidth needs that follow non-linear patterns. For instance, accounting firms generally require more bandwidth during tax season than during other times of the year. Non-linear bandwidth models can model the bandwidth needs of an accounting firm more reliably than linear bandwidth models. For example, a non-linear bandwidth model could capture peak bandwidth usage periods (tax season) and the troughs (other seasons). In contrast, linear bandwidth models are not able to capture bandwidth patterns having peaks and troughs. A bandwidth projection for the accounting firm generated by a non-linear bandwidth model will be more accurate than a bandwidth projection generated by a linear bandwidth model. As a result, the accounting firm will enjoy sufficient bandwidth during tax season. During other seasons, the bandwidth provided to the accounting firm will be reduced based on the improved bandwidth projection.

A bandwidth projection system as described herein could be used in various communication environments. For example, the bandwidth projection system could be used to size a T-1 link based on historical erlang data. In another example, the bandwidth projection system could be used to project bits per second requirements on an Internet protocol link based on historical bandwidth data. In yet another example, the bandwidth projection system could be used to size the capacity of a wireless communication link based on historical signal strength and bandwidth data.

Figure 6:
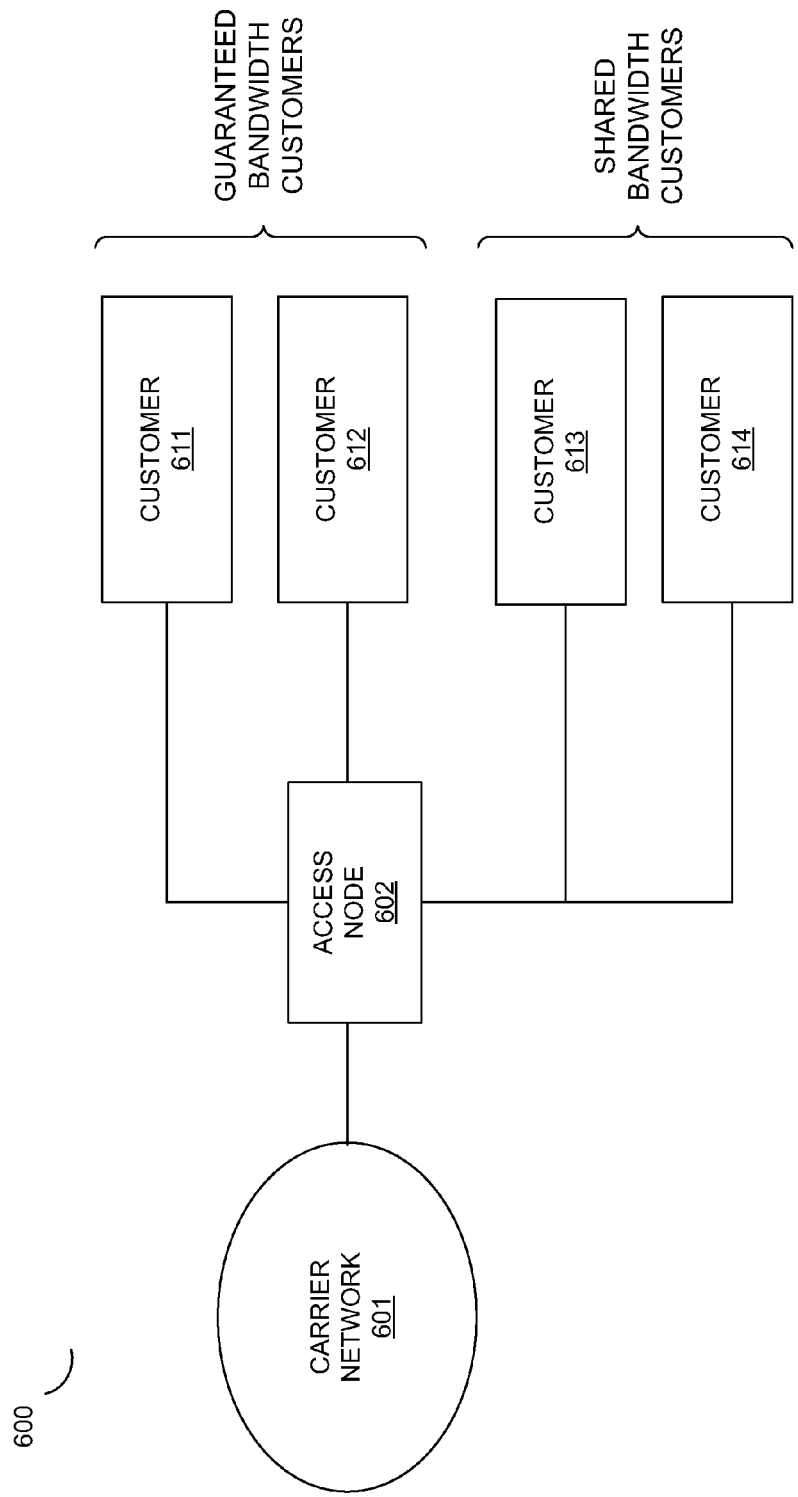
FIG. 6 illustrates a communication network in an embodiment of the invention.

FIG. 6 illustrates a communication network 600 in an embodiment of the invention. Communication network 600 includes carrier network 601, access node 602, customer 611, customer 612, customer 613, and customer 614. Access node 602 connects customers 611-614 to carrier network 601. Computers or other communication equipment operated by customers 611-614 exchange communications with each other and other nodes through access node 602 and carrier network 601.

In this embodiment, a service provider owns or operates carrier network 601. The service provider enters into service contracts with customers 611-612 that require the service provider to provide customers 611-612 with guaranteed minimum amounts of bandwidth through access node 602 to carrier network 601 during future time periods.

For instance, the service provider may guarantee customer 611 the ability for customer 611 to communicate through access node 602 using computers or other communication equipment at a certain specified rate, such as bits-per-second. In another example, the service provider may guarantee customer 611 the ability to exchange, using computers or other communication equipment, a certain, finite amount of data during a certain period, such as a maximum number of bits per month. Other types of guaranteed bandwidth are possible. Likewise, the service provider could guarantee customer 612 bandwidth.

Further in this embodiment, the service provider enters into service contracts with customers 613-614 that require the service provider to provide customers 613-614 with a shared amount of bandwidth through access node 602 to carrier network 601. Because access node 602 has a finite amount of bandwidth, and because a certain amount of the bandwidth has been guaranteed to customers 611-612, the remaining portion of bandwidth available on access node 602 must be shared between customers 613-614. Typically, the service provider agrees with shared bandwidth customers 613-614 to provide a best-effort amount of bandwidth, but cannot promise to deliver that much bandwidth. Shared bandwidth agreements may be desired by customers 613-614 because, among other reasons, shared bandwidth agreements typically cost less than guaranteed bandwidth agreements.

As mentioned, access node 602 has a finite amount of capacity or bandwidth initially available to customers 611-614. A shared amount of bandwidth in this context means that neither customer 613 nor customer 614 is guaranteed a certain amount of bandwidth. Rather, each customer 613 and 614 is able to enjoy the amount of residual bandwidth that is available at the present time. However, the service provider must reserve at least the minimum amount of bandwidth guaranteed to customers 611 and 612. The maximum residual bandwidth that remains is the total amount of bandwidth through access node 602 less the guaranteed bandwidth. Customers 613 and 614 then share the residual bandwidth.

As discussed above with respect to the prior art, bandwidth projections are frequently used to determine the minimum amounts of bandwidth required to satisfy service agreements. Service providers utilize bandwidth models to project the future bandwidth needs of their customers. However, service provider may also utilize bandwidth models to project the future bandwidth needs of their own nodes, such as access node 602.

To make future projections, communication service providers use a model application to generate a bandwidth model based on a historical dataset. The bandwidth model is used to create the future projection. For example, a service provider may use a linear projection to size a T-1 communication link based on erlang data.

When the minimum amount of bandwidth specified by a bandwidth projection is less than an actual bandwidth need, the service provider may not provision a particular node with enough bandwidth. Likewise, when the minimum amount of bandwidth specified by a bandwidth projection is greater than the actual bandwidth need, the service provider may waste bandwidth.

In many cases, linear models are used to model bandwidth of service provider nodes, such as access node 602. However, linear models frequently do not closely resemble historical data sets and do not produce accurate bandwidth projections. In many cases, the relationship between bandwidth usage and time may not be linear. For example, the graph of bandwidth usage over time by a node often times will not follow a straight line and may include many peaks and troughs that correspond to high and low bandwidth usage. However, the graph of a linear model is a straight line. The graph of a linear bandwidth projection will also be a straight line. The linear bandwidth projection will produce periods of time where the projection is too high and other periods of time where the projection is too low when compared to actual bandwidth usage.

In view of the demands placed on the service provider by guaranteed bandwidth agreements, it is very important that the models used by the service provider to project bandwidth usage for access node 602 are accurate. However, linear models that are used to produce bandwidth projections may not accurately project future bandwidth usage of access node 602. Rather, the bandwidth projections may be higher than the actual future bandwidth usage during some periods of time. The bandwidth projections may also be lower than the actual future bandwidth usage during other periods of time.

Further problematically, linear bandwidth models are generated using only a single model application. Using only a single model application limits the resulting bandwidth models from which a best fit bandwidth model is selected, thereby limiting the ability of the service provider to accurate project the future bandwidth usage of access node 602.

Figure 7:
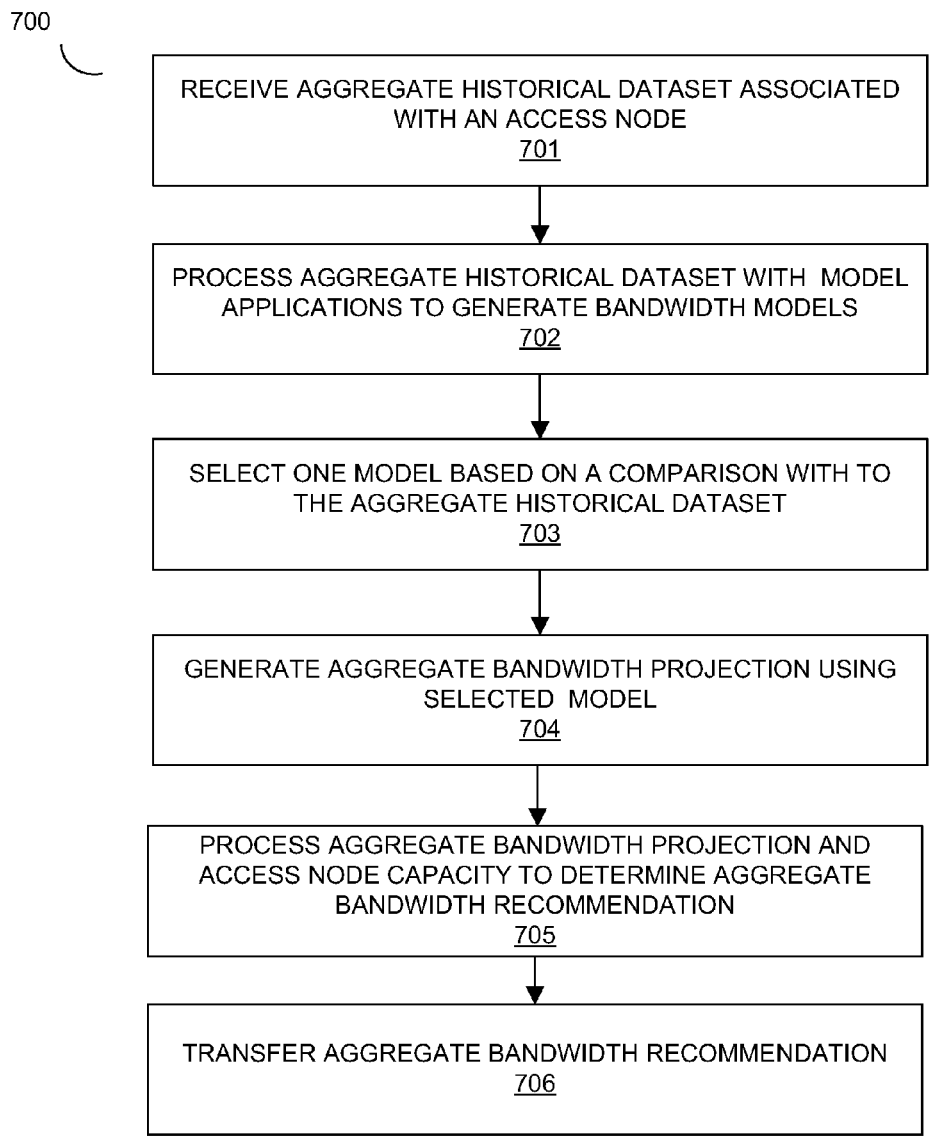
FIG. 7 illustrates a process in an embodiment of the invention.

FIG. 7 illustrates a process 700 that could be employed by a bandwidth projection system to generate bandwidth projections for access node 602. Referring to FIG. 7, the bandwidth projection system receives an aggregate historical dataset associated with access node 602 (Step 701). An aggregate data set means that the data set represents the aggregate, or total, bandwidth usage by customers 611-614. The historical dataset indicates bandwidth usage of access node 602 by customers 611-614 during a historical time period.

Upon receiving the historical dataset, the bandwidth projection system processes the aggregate historical dataset with multiple model applications to generate multiple bandwidth models based on the aggregate historical dataset (Step 702). It should be understood that the multiple bandwidth models could be non-linear models.

Processing the aggregate historical dataset could include cleaning the dataset, such as by rectifying missing data or outliers. For example, missing data could be replaced with new data. In another example, outliers could be replaced with new data. For instance, the new data could be derived from the average of all data in the dataset or the average of nearby data.

Processing the aggregate historical dataset to generate the bandwidth models could also include processing various factors that influence the bandwidth models, such as growth, chronological, and seasonal factors, as elaborated on above. The model applications can weight the historical data set based on the various factors.

It should be understood that each model application could be different. For example, one model application could be a Holt-Winters model application, while another model application could be an exponential model application. Other types of model applications are possible. Model applications are available from model application vendors. SAS is an example of a vendor. Each different model application could therefore process the historical datasets differently and generate different bandwidth models.

It should be further understood that each model application could generate multiple bandwidth models by processing the aggregate historical dataset differently for each bandwidth model. For example, a first model application could weight the aggregate historical dataset to generate a first bandwidth model. The first model application could then weight the aggregate historical dataset differently in order to generate a second bandwidth model. The first and second bandwidth models would differ as result of the different weightings.

After generating the various bandwidth models, the bandwidth projection system selects one of the bandwidth models from the multiple bandwidth models based on a comparison to the aggregate historical dataset (Step 703). The bandwidth projection system could perform the comparison between the aggregate historical dataset and each of the bandwidth models. In one example, the selected bandwidth model could be the bandwidth model that has the best fit with the aggregate historical dataset. A root-mean squared error function is one technique to determine a best fit. Other comparisons are possible.

Once selected, the bandwidth projection system generates an aggregate bandwidth projection for access node 602 using the selected bandwidth model (Step 704). The aggregate bandwidth projection could indicate a projected bandwidth usage by access node 602 during a future time period.

As mentioned, access node 602 has a finite amount of bandwidth capacity. Therefore, the bandwidth projection system compares the aggregate bandwidth projection to the present capacity of access node 602 to determine a bandwidth recommendation (Step 705). In one instance, the recommendation comprises a recommendation to accept or reject the bandwidth projection based on whether access node 602 has sufficient present capacity to meet the bandwidth projection. In another instance, the recommendation comprises a recommendation to add bandwidth capacity to access node 602, such as by adding equipment to access node 602. Other recommendations are possible.

Upon generating the recommendation, the bandwidth projection system transfers the recommendation to an appropriate entity that can accept and act on the recommendation (Step 706). Alternatively, the entity could reject the recommendation and formulate a different response to the bandwidth projection. The entity could be personnel that administer access node 602 for the service provider, such as network engineers.

Figure 8:
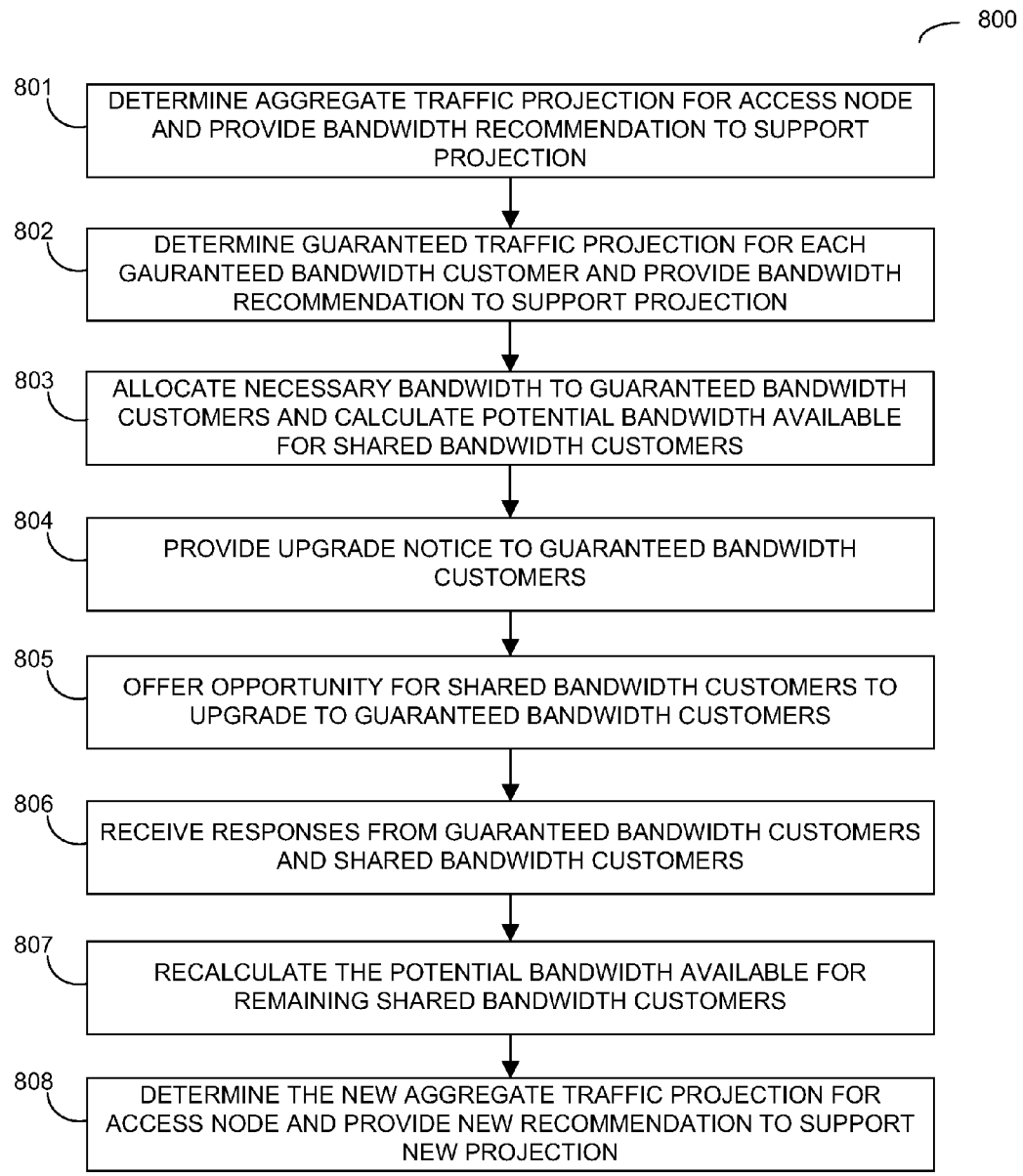
FIG. 8 illustrates a process in an embodiment of the invention.

FIG. 8 illustrates a process 800 that could be employed by a bandwidth projection system to generate bandwidth projections for access node 602. Referring to FIG. 8, the bandwidth projection system in Step 801 receives an aggregate historical dataset associated with access node 602. The bandwidth projection system processes the historical dataset to generate an aggregate bandwidth projection for access node 602. The bandwidth projection system then generates a bandwidth recommendation to support the aggregate bandwidth projection. For example, the recommendation could be to increase the bandwidth capability of access node 602 or retain the present bandwidth capability of access node 602. It should be understood that process 700 illustrated in FIG. 7 could be performed by the bandwidth projection system to accomplish Step 801.

In Step 802, the bandwidth projection system generates a guaranteed traffic projection for each guaranteed bandwidth customer 611 and 612. The bandwidth projection system generates a bandwidth recommendation to support the guaranteed traffic projection for the guaranteed bandwidth customers. For example, the recommendation could be to increase the bandwidth capability of access node 602 to at least meet the bandwidth requirements projected for the guaranteed bandwidth customers. Again, it should be understood that process 700 could be employed by the bandwidth projection system to accomplish Step 802.

In step 803, the bandwidth projection system allocates the appropriate bandwidth amounts to each guaranteed bandwidth customer 611 and 612. The bandwidth projection system then calculates the potential bandwidth available for the shared bandwidth customers 613 and 614. The potential bandwidth available for the shared bandwidth customers is the total bandwidth available through access node 602 less an amount of bandwidth related to the bandwidth guaranteed to guaranteed bandwidth customers 611 and 612. The more bandwidth that is allocated to guaranteed bandwidth customers 611 and 612, the less bandwidth that is available to be allocated to shared bandwidth customers 613 and 614.

In Step 804, the bandwidth projection system provides an upgrade notice to guaranteed bandwidth customers 611 and 612 that, according to the guaranteed bandwidth projection, the guaranteed bandwidth customers should upgrade to a higher guaranteed bandwidth amount that can accommodate the bandwidth projected by the guaranteed bandwidth projection. The upgrade notice could be provided in an email notification, a phone call, a mailing, displayed on a website, or provided in some other form.

Likewise, in Step 805 the bandwidth projection system offers an opportunity for shared bandwidth customers 613 and 614 to upgrade to guaranteed status as guaranteed bandwidth customers. The opportunity could be provided in an email, displayed on a website, discussed in a phone solicitation, a mailing, or in some other manner.

After having provided an upgrade notice to guaranteed bandwidth customers in Step 804 and offering to upgrade the shared bandwidth customers to guaranteed status in Step 805, in Step 806 the bandwidth projection system receives responses from the guaranteed and shared bandwidth customers indicating their acceptance or rejection of the upgrade offers. The responses could be in the form of return emails, electronic inputs via a website, voice confirmation on a phone call, a return mailing, or some other form conveying the acceptance or rejection.

Upon receiving the responses from the guaranteed and shared bandwidth customers, in Step 807 the bandwidth projection system recalculates the remaining bandwidth available for the shared bandwidth customers. For example, shared bandwidth customers 613 may accept the offer to upgrade to guaranteed status. This upgrade would increase the amount of bandwidth allocated to guaranteed bandwidth customers and would decrease the amount of bandwidth available to shared bandwidth customers. Therefore, a new shared bandwidth amount must be calculated and provided to the shared bandwidth customers. In this case, shared bandwidth customer 614 is notified of the new shared bandwidth amount that is available.

It should be understood that the acceptance by any of the guaranteed bandwidth customers 611 and 612 of their respective offers could also alter the amount of shared bandwidth available to the remaining shared bandwidth customers. For example, assume that the bandwidth projection for guaranteed bandwidth customer 611 projected an increase in bandwidth usage by guaranteed bandwidth customer 611. If guaranteed bandwidth customer 611 accepts the projection, then an increased amount of bandwidth through access node 602 must be reserved for that customer. This increase in guaranteed bandwidth would decrease the amount of bandwidth available to shared bandwidth customers.

In Step 808, the bandwidth projection system determines a new aggregate traffic projection for access node 602 taking into account the acceptances and rejections by guaranteed bandwidth customers 611 and 612 and shared bandwidth customers 613 and 614. The bandwidth projection system provides a new recommendation based on the new aggregate traffic projection to network personnel for consideration in design decisions. The new recommendation indicates a bandwidth amount required of access node 602 to meet the projected needs of the guaranteed bandwidth customers, along with sufficient available bandwidth for shared bandwidth customers.

The following describes the operation of a bandwidth projection system in yet another embodiment. In this embodiment, the service provider employs process 300 illustrated in FIG. 3 to generate the variable bandwidth projections for each customer 611 and 612. At times, the total bandwidth projection for customers 611 and 612 may exceed the initial capacity of access node 602. In such circumstances, sufficient capacity will not be available for customers 613 and 614. As a result, customers 613 and 614 may become dissatisfied. The following describes the operation of a bandwidth projection system for ensuring that sufficient capacity is available for guaranteed customers 611 and 612 as well as for shared bandwidth customers 613 and 614.

To begin, the bandwidth projection system determines an initial shared bandwidth projection for access node 602. The shared bandwidth projection indicates a shared bandwidth usage during a future time period by customers 613 and 614. As discussed above access node 602 has an initial bandwidth capacity. The initial shared bandwidth projection for access node 602 could be calculated based on the total guaranteed bandwidth projected for customers 611 and 612 and the initial maximum capacity of access node 602. For example, the initial shared bandwidth projection could be the difference between the initial maximum capacity of access node 602 and the total guaranteed bandwidth projected for customers 611 and 612. Other methods for determining the initial shared bandwidth projection are possible.

The bandwidth projection system then determines an aggregate bandwidth projection comprising the guaranteed bandwidth projections for customers 611 and 612 and the initial shared bandwidth projection for customers 613 and 614. The bandwidth projection system processes the aggregate bandwidth projection to determine if the aggregate bandwidth projection exceeds the initial bandwidth capacity of access node 602. Upon determining whether or not the aggregate bandwidth projection exceeds the initial bandwidth capacity of access node 602, the bandwidth projection system initiates a change to the bandwidth capacity of access node 602.

In one example, the bandwidth projection system increases the initial bandwidth capacity of access node 602 to a new bandwidth capacity in response to determining that the aggregate bandwidth projection exceeds the initial bandwidth capacity of access node 602. For instance, additional equipment could be added to access node 602 to increase its capacity. In addition, the bandwidth projection system could process the new bandwidth capacity of access node 602 with the guaranteed bandwidth projections for customers 611 and 612 to generate a new shared bandwidth projection for access node 602. Optionally, the bandwidth projection system could transmit an update to customers 613 and 614 indicating the new shared bandwidth projection.

In another example, the bandwidth projection system reduces the guaranteed bandwidth projections for customers 611 and 612 if the aggregate bandwidth projection exceeds the initial bandwidth capacity of access node 602.

Figure 9:
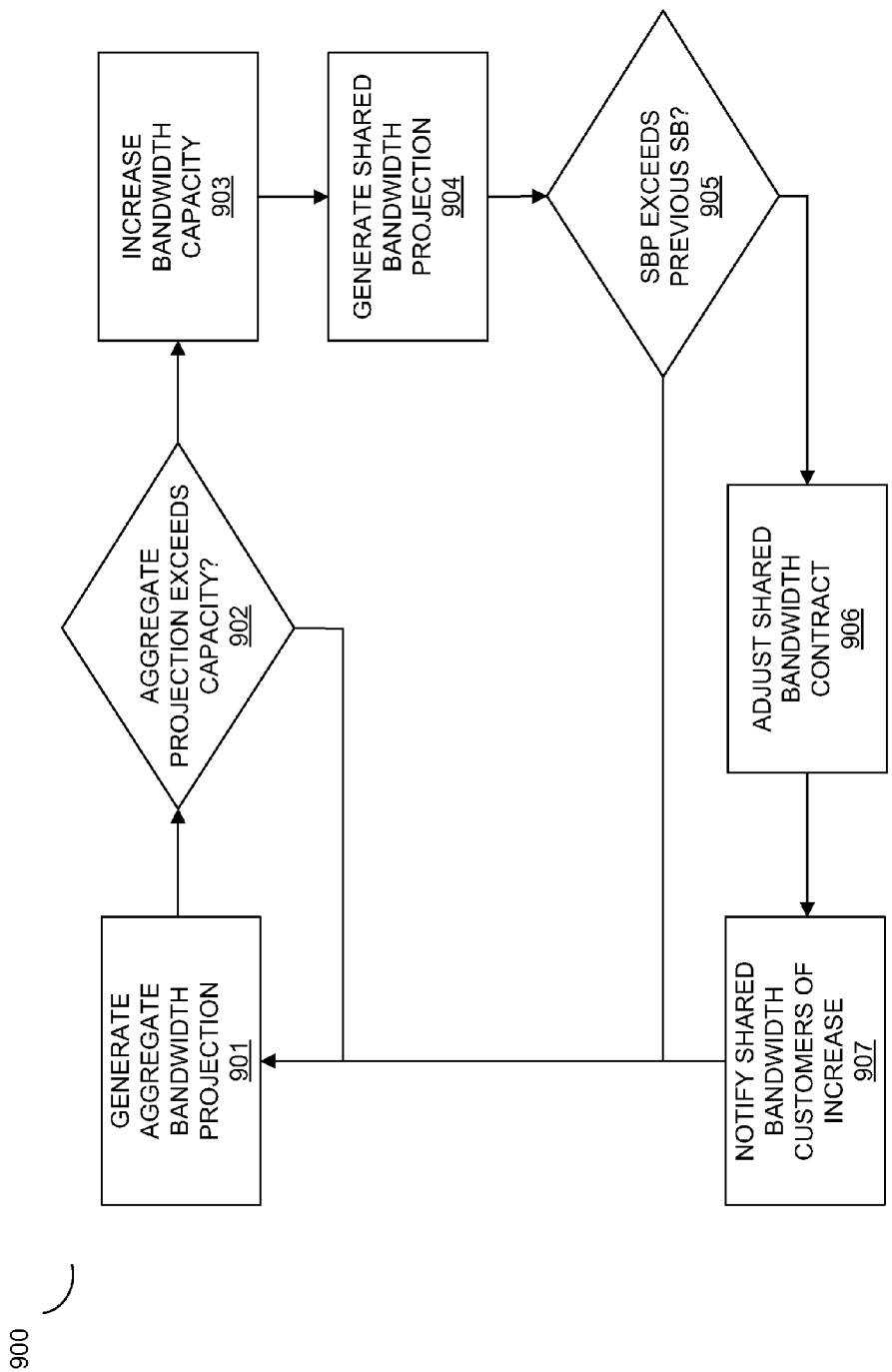
FIG. 9 illustrates a process in an embodiment of the invention.

FIG. 9 illustrates a process 900 that could be employed by a bandwidth projection system for monitoring aggregate bandwidth demand and pro-actively adjusting the shared bandwidth contracts for customers 613 and 614.

Referring to FIG. 9, a bandwidth projection system generates an aggregate bandwidth projection for access node 602. (Step 901). The aggregate bandwidth projection projects the total bandwidth demand on access node 602 for a future time period. The aggregate bandwidth projection includes individual bandwidth projections for each customer 611 and 612. The aggregate bandwidth projection could include a shared bandwidth projection for customers 613 and 614.

Next, the bandwidth projection system processes the aggregate bandwidth projection with the present capacity of access node 602 to determine if the aggregate bandwidth projection exceeds the present capacity of access node 602. (Step 902). If the aggregate projection does not exceed the capacity of access node 602, then the bandwidth projection system returns to Step 901. If the aggregate projection does exceed the capacity of access node 602, then the bandwidth capacity of access node 602 is increased. (Step 903).

After increasing the bandwidth capacity of access node 602, the bandwidth projection system generates a shared bandwidth projection for customers 613 and 614. (Step 904). The shared bandwidth projection is a projection of the likely residual bandwidth available to customers 613 and 614 in view of the new bandwidth projections generated for customers 611 and 612 and in view of the new bandwidth available through access node 602.

The new shared bandwidth projection is processed with the previous actual shared bandwidth experienced by customers 613 and 614 to determine if the new shared bandwidth exceeds the previous actual shared bandwidth. (Step 905). If the new shared bandwidth does not exceed the previous shared bandwidth, then the bandwidth projection system returns to Step 901. If the new shared bandwidth does exceed the previous shared bandwidth, then the service provider can adjust the shared bandwidth contract to specify the new shared bandwidth amount. (Step 906). The service provider can notify the shared bandwidth customers 613 and 614 of the increased bandwidth available under the shared bandwidth contract. (Step 907).

Figure 10:
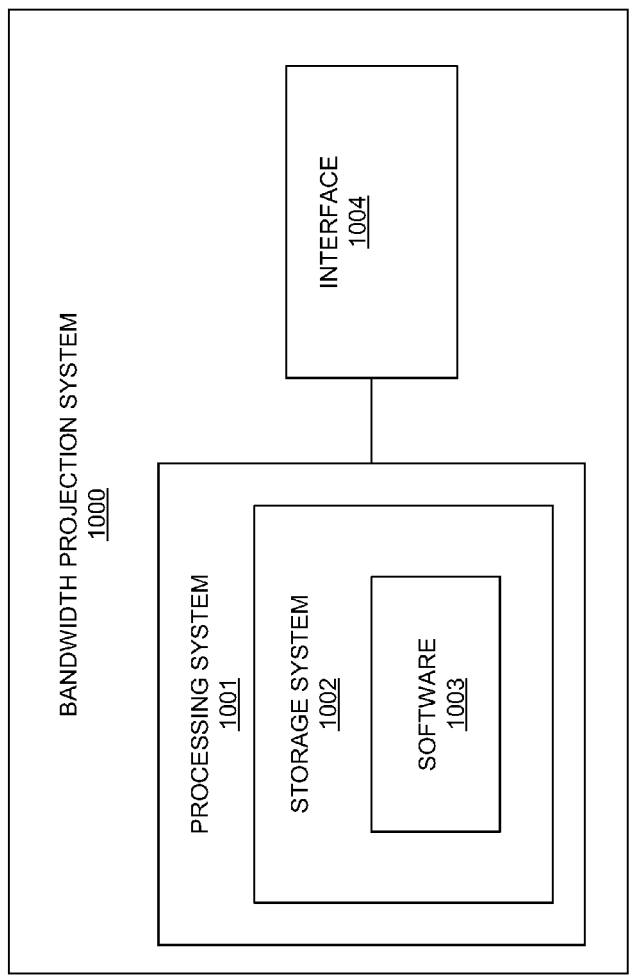
FIG. 10 illustrates a bandwidth projection system in an embodiment of the invention.

FIG. 10 illustrates bandwidth projection system 1000 in an embodiment of the invention. Bandwidth projection system 1000 includes processing system 1001, storage system 1002, software 1003, and interface 1004. Processing system 1001 is linked to storage system 1002 and interface 1004. Storage system 1002 stores software 1003. Bandwidth projection system 1000 could comprise a programmed general-purpose computer, although those skilled in the art will appreciate that programmable or special purpose circuitry and equipment may be used. Bandwidth projection system 1000 may use a distributed architecture such that various devices together comprise elements 1001-1004.

Processing system 1001 could comprise a computer microprocessor, logic circuit, or some other processing device. Processing system 1001 could be distributed among multiple processing devices.

Storage system 1002 could comprise a disk, tape, integrated circuit, server, volatile or non-volatile memory, or some other memory device. Storage system 1002 may be distributed among multiple memory devices.

Interface 1004 could comprise a network interface card, modem, port, or some other communication device. Interface 1004 may be distributed among multiple communication devices.

Processing system 1001 retrieves and executes software 1003 from storage system 1002. Software 1003 may comprise an operating system, utilities, drivers, networking software, an application program, firmware, or some other form of machine-readable processing instructions. Software 1003 may be distributed among multiple implementations of machine-readable processing instructions. When executed by the processing system 1001, software 1003 directs processing system 1001 to operate as described herein for a bandwidth projection system.

Those skilled in the art will appreciate that the features described above can be combined in various ways to form multiple embodiments of the invention. As a result, the invention is not limited to the specific embodiments described above, but only by the claims and their equivalents.

What is claimed is:

1. A method of operating a bandwidth projection system, the method comprising:
    determining an initial shared bandwidth projection for an access node having an initial bandwidth capacity, wherein the shared bandwidth projection indicates a shared bandwidth usage during a future time period by a plurality of shared bandwidth customers;
    generating a plurality of guaranteed bandwidth projections for the access node, wherein the plurality of guaranteed bandwidth projections indicate a plurality of bandwidth usage during the future time period by a plurality of guaranteed bandwidth customers;
    determining an aggregate bandwidth projection comprising the plurality of guaranteed bandwidth projections and the initial shared bandwidth projection; and
    processing the aggregate bandwidth projection to determine if the aggregate bandwidth projection exceeds an initial bandwidth capacity of the access node.

2. The method of claim 1 further comprising increasing the initial bandwidth capacity of the access node to a new bandwidth capacity if the aggregate bandwidth projection exceeds the initial bandwidth capacity of the access node.

3. The method of claim 2 further comprising processing the new bandwidth capacity of the access node with the plurality of guaranteed bandwidth projections to generate a new shared bandwidth projection for the access node.

4. The method of claim 1 further comprising reducing the guaranteed bandwidth projections if the aggregate bandwidth projection exceeds the initial bandwidth capacity of the access node.

5. The method of claim 1 further comprising transmitting an update to the plurality of shared bandwidth customers indicating the new shared bandwidth projection.

6. The method of claim 1 generating the plurality of guaranteed bandwidth projections for the access node using non-linear bandwidth models.

7. A storage medium, having program instructions stored thereon and executable by a processor for operating a bandwidth projection system, that when executed by the processor direct the bandwidth projection system to:
    determine an initial shared bandwidth projection for an access node having an initial bandwidth capacity, generate a plurality of guaranteed bandwidth projections for the access node, determine an aggregate bandwidth projection comprising the plurality of guaranteed bandwidth projections and the initial shared bandwidth projection, and process the aggregate bandwidth projection to determine if the aggregate bandwidth projection exceeds an initial bandwidth capacity of the access node.

8. The storage medium of claim 7 wherein the program instructions when executed by the processor further direct the bandwidth projection system to increase the initial bandwidth capacity of the access node to a new bandwidth capacity if the aggregate bandwidth projection exceeds the initial bandwidth capacity of the access node.

9. The storage medium of claim 8 wherein the program instructions when executed by the processor further direct the bandwidth projection system to process the new bandwidth capacity of the access node with the plurality of guaranteed bandwidth projections to generate a new shared bandwidth projection for the access node.

10. The storage medium of claim 7 wherein the program instructions when executed by the processor further direct the bandwidth projection system to reduce the guaranteed bandwidth projections if the aggregate bandwidth projection exceeds the initial bandwidth capacity of the access node.

11. The storage medium of claim 7 wherein the plurality of guaranteed bandwidth projections indicate a plurality of bandwidth usage during a future time period by a plurality of guaranteed bandwidth customers.

12. The storage medium of claim 7 wherein the shared bandwidth projection indicates a shared bandwidth usage during a future time period by a plurality of shared bandwidth customers.

13. The storage medium of claim 12 wherein the program instructions when executed by the processor further direct the bandwidth projection system to transmit an update to the plurality of shared bandwidth customers indicating the new shared bandwidth projection.

14. The storage medium of claim 7 wherein the bandwidth projection system generates the plurality of guaranteed bandwidth projections for the access node using non-linear bandwidth models.

* * * * *